United States Patent
Ramalingam (10) Patent No.: US 12,294,941 B2
(45) Date of Patent: May 6, 2025

(54) SYNCHRONIZED DOWNLINK AND UPLINK MULTI-USER MIMO CANDIDATE SELECTION IN MASSIVE-MIMO SYSTEM

(71) Applicant: Mavenir Networks, Inc., Richardson, TX (US)

(72) Inventor: Manoharan Ramalingam, Bengaluru (IN)

(73) Assignee: Mavenir Networks, Inc., Richardson, TX (US)

(*) Notice: Subject to any disclaimer, the term of this patent is extended or adjusted under 35 U.S.C. 154(b) by 367 days.

(21) Appl. No.: 17/846,788

(22) Filed: Jun. 22, 2022

(65) Prior Publication Data

US 2023/0018556 A1    Jan. 19, 2023

Related U.S. Application Data

(60) Provisional application No. 63/218,719, filed on Jul. 6, 2021.

(51) Int. Cl.
*H04W 48/20*    (2009.01)
*H04B 7/0452*   (2017.01)
*H04L 5/00*     (2006.01)

(52) U.S. Cl.
CPC .......... *H04W 48/20* (2013.01); *H04B 7/0452* (2013.01); *H04L 5/0051* (2013.01)

(58) Field of Classification Search
CPC ..... H04W 48/20; H04B 7/0452; H04L 5/0051
USPC ........................................................ 370/329
See application file for complete search history.

(56) References Cited

U.S. PATENT DOCUMENTS

| | | | |
|---|---|---|---|
| 9,743,258 B1 | 8/2017 | Elsherif et al. | |
| 2016/0345343 A1* | 11/2016 | Elsherif | H04B 7/0689 |
| 2018/0234141 A1* | 8/2018 | Silverman | H04L 43/0894 |
| 2023/0006717 A1* | 1/2023 | Sahin | H04B 7/0639 |

OTHER PUBLICATIONS

Extended European Search Report for corresponding European Patent Application No. EP22183021.9, 9 pages, dated Nov. 8, 2022.

(Continued)

*Primary Examiner* — Nicholas R Taylor
*Assistant Examiner* — Chong G Kim
(74) *Attorney, Agent, or Firm* — Ruggiero McAllister & McMahon LLC (57) ABSTRACT

A method for synchronized selection of user equipments (UEs) for both downlink (DL) Multi-User Multiple Input Multiple Output (MU-MIMO) operation and uplink (UL) MU-MIMO operation includes: applying a common set of selection criteria for selecting a common pool of UE candidates for both DL and UL MU-MIMO operations, wherein the common set of selection criteria are applied in Stage-1 selection process to select Stage-1 candidates for a UE candidates list; and if the Stage-1 selection process applying the common set of selection criteria is not able to find UE candidates to fill available slots in the UE candidates list, initiating Stage-2 selection process involving 1) applying a first set of Stage-2 selection criteria to select DL-only traffic UEs as Stage-2 candidates for the UE candidates list, and 2) applying a second set of Stage-2 selection criteria to select UL-only traffic UEs as Stage-2 candidates for the UE candidates list.

19 Claims, 3 Drawing Sheets

(56) References Cited

OTHER PUBLICATIONS

Zhang et al. "SRS Limited User Grouping Scheduling Algorithm for Downlink Massive MIMO Systems", 2019 IEEE Wireless Communications and Networking Conference (WCNC) IEEE, Apr. 15, 2019.

* cited by examiner

SYNCHRONIZED DOWNLINK AND UPLINK MULTI-USER MIMO CANDIDATE SELECTION IN MASSIVE-MIMO SYSTEM

CROSS REFERENCE TO RELATED APPLICATION

The present application claims priority to U.S. Provisional Patent Application No. 63/218,719, filed on Jul. 6, 2021, which is incorporated herein by reference in its entirety.

BACKGROUND OF THE DISCLOSURE

1. Field of the Disclosure

The present disclosure relates to methods for improving Massive Multiple Input Multiple Output (mMIMO) and/or Multi-User Multiple Input Multiple Output (MU-MIMO), and relates more particularly to synchronized selection of downlink and uplink MU-MIMO candidate user equipments (UEs).

2. Description of the Related Art

Sounding Reference Signal (SRS) is a physical signal transmitted in uplink (UL) to enable the eNB and/or gNB to estimate the Channel State Information (CSI) over a range of frequencies in the system (e.g., 4G or 5G system). The estimation of the CSI assists the eNB/gNB scheduler to properly allocate radio resource to the UE. In addition, the SRS transmission is important for supporting transmit and receive beamforming in mMIMO and/or MU-MIMO (hereinafter collectively referred to as mMIMO/MU-MIMO; mMIMO and MU-MIMO are used interchangeably in the present disclosure) solution based on Time Division Duplex (TDD). For TDD MU-MIMO solution for downlink (DL) only, the SRS capacity can be dimensioned considering only the DL, e.g., for 64 UEs. In contrast, when UL MU-MIMO solution is being designed along with the DL MU-MIMO solution, the SRS capacity needs to be dimensioned for both the DL and UL. However, the SRS capacity cannot be increased as required, due to the SRS periodicity limitation, which is very important to get up-to-date channel information.

In a conventional MU-MIMO solution, i) after the selection of the DL MU-MIMO candidate UEs, the SRS is configured for those candidate UEs, and ii) after the selection of the UL MU-MIMO candidate UEs, the SRS is configured for those candidate UEs separately. The selection criteria for the UL MU-MIMO candidate UEs are implemented in parallel to the selection criteria for the DL MU-MIMO candidate UEs, without synchronization between the two sets of selection criteria. Because the SRS capacity is dimensioned for a cell, common for DL and UL MU-MIMO, the parallel DL and UL candidate UE selections and corresponding SRS configurations lead to splitting of the SRS capacity between the DL and UL candidate UE lists. Because the MU-MIMO candidate UE list size depends on the SRS capacity, splitting of the already limited SRS capacity between the DL and UL MU-MIMO solutions (algorithms) leads to reduced size of MU-MIMO candidate UE lists, which is not desirable. Therefore, there is a need for an improved technique for selection of DL and UL MU-MIMO candidate UEs while maximizing the SRS capacity.

SUMMARY OF THE DISCLOSURE

In an example method according to the present disclosure, in order to maximize the efficient use of the SRS capacity, the SRS capacity of a cell is not split between DL and UL MU-MIMO solutions (algorithms) in the eNB/gNB mMIMO system.

In an example embodiment according to the present disclosure, the selection of mMIMO/MU-MIMO candidate UEs in the DL and UL is synchronized, i.e., the selection is implemented to ensure an optimal selection for both DL and UL. The synchronized selection of mMIMO/MU-MIMO candidate UEs in the DL and UL can be applied to any Time Division Duplex (TDD)-based mMIMO/MU-MIMO system.

In an example embodiment according to the present disclosure, the selection of mMIMO/MU-MIMO candidate UEs in the DL and UL is synchronized by having a common pool of UEs selected for both DL and UL mMIMO/MU-MIMO operation, using common selection criteria (which selection using the common selection criteria is referred to as Stage-1, and the UEs selected in this manner are referred to as Stage-1 candidates).

In an example embodiment according to the present disclosure, if the use of the Stage-1 common criteria does not result in finding of the mMIMO candidate UEs and there are available slots in the candidate list, then DL-only traffic UEs and UL-only traffic UEs can be selected as candidate UEs using selection criteria (which selection is referred to as Stage-2, and the UEs selected in this manner are referred to as Stage-2 candidates).

In an example embodiment according to the present disclosure, while Stage-2 selection process for candidate UEs is active, Stage-1 selection process for candidate UEs will also be active, i.e., Stage-1 selection criteria are checked in parallel along with Stage-2 selection criteria.

In an example embodiment according to the present disclosure, whenever the use of the Stage-1 common criteria leads to finding of the mMIMO candidate UEs while the Stage-2 selection process is active and there is no available slot in the candidate list, the Stage-2 candidates on the candidate list will be deleted (preempted).

DETAILED DESCRIPTION

Figure 1:
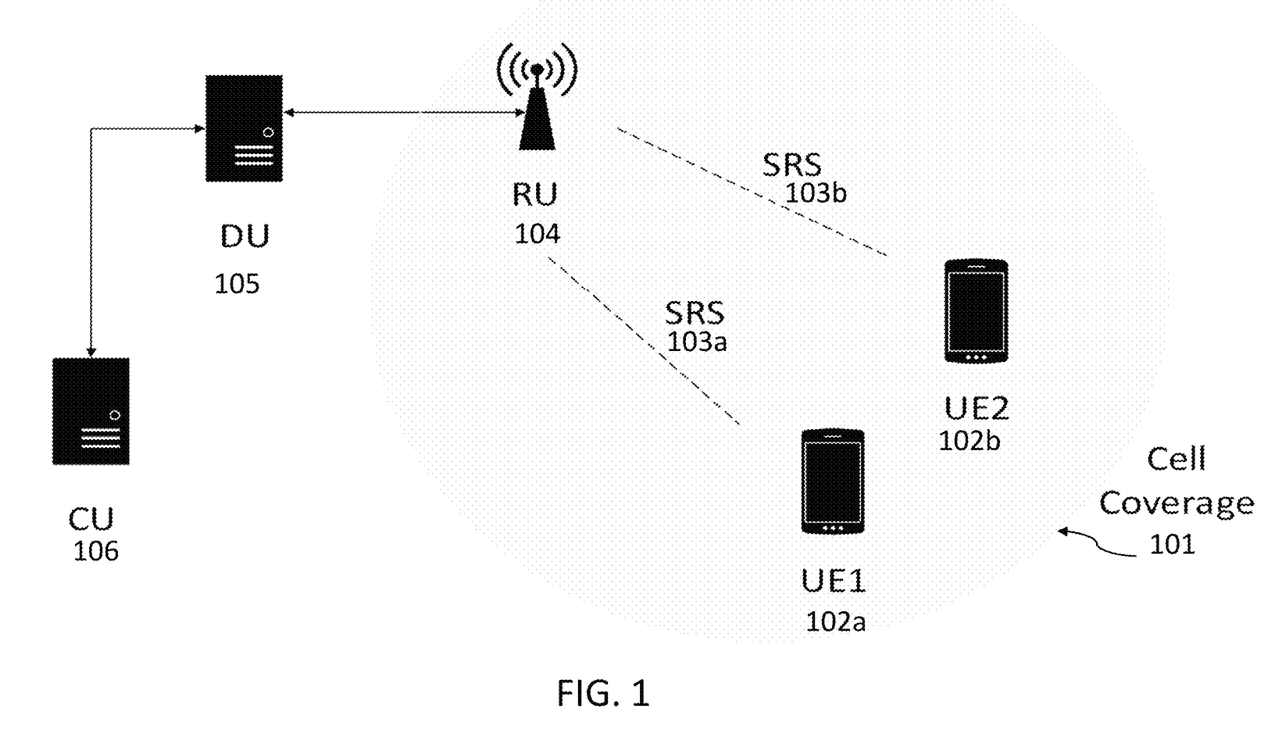
FIG. 1 illustrates an example embodiment of a wireless network for the purposes of explaining the synchronized selection of mMIMO/MU-MIMO candidate UEs.

FIG. 1 illustrates an example embodiment of a wireless network for the purposes of explaining the synchronized selection of mMIMO/MU-MIMO candidate UEs in the DL and UL. As shown in FIG. 1, UE1 102a and UE2 102b located in cell coverage area 101 transmit SRS 103a and SRS 103b, respectively, to radio unit (RU) 104. RU 104, distributed unit (DU) 105 and centralized unit (CU) 106 shown in FIG. 1 together form eNB or gNB.

As mentioned above, SRS (e.g., 103a and 103b) are physical signals transmitted in UL to enable the eNB and/or gNB to estimate the CSI over a range of frequencies in the system, which estimation of the CSI assists the eNB/gNB scheduler to properly allocate radio resource to the UE. In addition, the SRS transmission can also be used to support transmit and receive beamforming in the mMIMO system. SRS sent on the UL by a UE allows estimation of the UL channel at the eNB/gNB. Under the assumption the DL channel is reciprocal to the UL channel in TDD, the same estimation can be used for DL precoding, which is a key feature of mMIMO multi-beam transmission. SRS configuration notified to UE by radio resource control (RRC) message is referred to as Dedicated SRS Configuration. SRS Configuration notified to UE by system information block (SIB) message is Cell Specific SRS and is referred to as common SRS Configuration.

While conventional mMIMO and/or MU-MIMO algorithms in the eNB and/or gNB are cross-layer algorithms spread across Media Access Control (MAC) Layer and Physical Layer, the example embodiment described in the present disclosure is a MAC Layer algorithm for MU-MIMO solution. For mMIMO/MU-MIMO feature, eNB/gNB will introduce a new list called "mMIMO/MU-MIMO Candidate List" in the MAC scheduler, the criteria for choosing which candidates (UEs) are discussed in subsequent sections of the present disclosure. The mMIMO/MU-MIMO Candidate List is created by shortlisting all the UEs which can perform MU-MIMO transmissions (the mMIMO/MU-MIMO Candidate List will reflect only High throughput Logical channels of the UEs, e.g., Non-Guaranteed Bit Rate (Non-GBR) or Guaranteed Bit Rate (GBR) bidirectional traffic types such as "HD conversional Video calling" and "real-time gaming"). This MU-MIMO candidate list represents a subset of UEs in the cell which satisfies a predefined set of criteria, e.g., if a cell's capacity is 200 RRC-connected UEs, the MU-MIMO candidate list will be of size 64 UEs. The MU-MIMO Candidate List size depends on the SRS capacity. Each UE in the mMIMO Candidate List will be configured with SRS resources using RRC message to transmit the SRS in UL.

As mentioned previously, a conventional MU-MIMO solution will have separate MU-MIMO candidates lists for DL and UL. The DL and UL scheduler will use the respective MU-MIMO candidates lists as input to implement MU-MIMO-allocation user pairing. The MU-MIMO candidate is a long-term entity, but the MU-MIMO Candidate List is not a static list; instead, it is a dynamic list, which will have UEs added and deleted dynamically. The user pairing is an instantaneous scheduler decision on a transmission time interval (TTI)-by-TTI basis to pair UEs for a MU-MIMO allocation in the Physical Downlink Shared Channel (PDSCH) or Physical Uplink Shared Channel (PUSCH) channel (the scheduler decision process and the associated criteria are not relevant to the present disclosure and will be omitted).

According to publicly available data, the following types of data traffic constitute approximately 80% of data traffic in cellular networks: streaming; social media services; web browsing; and instant messaging. Data-intensive streaming and social media services, which are the most common usage for mobile internet, constitute approximately 50% of data traffic in cellular networks. Therefore, approximately 80% of application traffics have potential for both DL and UL traffic. More generally, there has been a steady increase in mobile internet users becoming content producers, and many of the uplinks demand high data rate, e.g., file uploading, video streaming, etc. Consequently, there is a good potential for both DL and UL traffic in the cellular network.

Shown below in Table 1 is the list of typical criteria for MU-MIMO candidate UE selection for DL and UL:

TABLE 1

| No. | DL MU-MIMO Candidate Selection Criteria | UL MU-MIMO Candidate Selection Criteria |
|---|---|---|
| 1 | Buffer Occupancy (BO) available for High throughput (for example, Non-GBR) Logical Channel | Buffer Status Report (BSR) pending for High throughput (for example, Non-GBR) logical channel group (LCG) |
| 2 | Low Mobility, UE Speed is less than 30 km/h. | Low Mobility, UE Speed is less than 30 km/h. |
| 3 | UE CQI should be High, CQI >= CQI Threshold | PUSCH SINR should be High, SINR >= SINR Threshold |
| 4 | UE BO should be High, BO >= BO Threshold | UE BSR should be high, BSR >= BSR Threshold |
| 5 | Availability of SRS Capacity | Availability of SRS Capacity |

Criteria 1, 2 and 5 shown in Table 1 are very similar in DL and UL, so any one of them (DL or UL) can be used as a common criterion. There are two candidate selection criteria mismatches between DL and UL shown in Table 1, i.e., criteria 3 and 4. Candidate selection criterion 3 is different for DL and UL in that CQI threshold criterion is used for DL and SINR threshold criterion is used for UL. This mismatch can be solved by checking DL Signal-to-Noise-Ratio (SINR) threshold for all UEs for both DL and UL. As the DL SINR threshold, one can use the DL Modulation and Coding Scheme (MCS) SINR before adding Outer Loop Rate Control (OLRC). The DL MCS SINR is mapped starting from DL CQI, i.e., first step converting DL CQI to SINR (referred to as "CQI-SINR"), then converting MCS to SINR (referred to as "MCS-SINR"), then as a final step mapping CQI-SINR to MCS-SINR to produce the DL MCS SINR. The DL MCS SINR reflects the perfect channel condition and is very granular, so there is no restriction in setting the particular threshold. The reason for choosing DL SINR (or more specifically, DL MCS SINR) is that DL SINR reflects the channel state of the UE more accurately than UL SINR. While the UL SINR depends on UE UL transmit power and the number of physical resource blocks (PRBs) over which the transmission is scheduled, the DL SINR (or more specifically, DL MCS SINR) which is mapped starting from DL CQI perfectly reflects the UE channel condition.

Notwithstanding the above, it should be noted that the UL and DL SINR for a UE often can be substantially the same. For example, SINR-to-MCS mapping tables for 4G/5G products often show that i) the DL and UL are the same in the case of DL and UL 64 Quadrature Amplitude Modulation (QAM) tables, and ii) the DL and UL are very similar even if the operating UE is using, e.g., DL 64QAM and UL 16QAM tables, or DL 256QAM and UL 64QAM tables, or DL 256QAM and UL 16QAM tables. For example, if one uses 64QAM DL MCS table and 16QAM (e.g., in LTE systems) UL MCS table, there are a few entries which are different, so for these entries the SINR will be different, and the 64QAM entries in DL MCS table which correspond to UL MCS table entries will change. Similarly, a few entries in DL and UL MCS tables will differ when UE is using DL 256QAM and UL 64QAM tables, or using DL 256QAM and UL 16QAM tables. However, even if the DL MCS entries are mapped to different entries in the UL MCS, this does not present a problem, since it is only required to have the SINR threshold value (e.g., 7 dB or 9 dB SINR) to be present in the MCS table to perform a check against the threshold.

From the MCS-SINR table, two things can be inferred: i) operating SINR for a given Modulation and coding scheme; and ii) channel condition of the UE, e.g., UE operating with MCS of QPSK is considered as Cell Edge UE, and UE operating with MCS of 64QAM is considered as Cell Near UE. The example DL SINR threshold criteria check described above is using DL MCS SINR to find the channel condition of the UE, rather than trying to find the operating SINR for MCS for UE, and using DL MCS SINR for finding UL channel condition is sufficiently accurate. In one example embodiment, the DL MCS SINR can be subjected to Infinite Impulse Response (IIR) filter and then used to i) handle the varying channel condition and its impact on the instantaneous DL CQI, and ii) to overcome the CQI computation error on the UE side.

Another candidate selection criterion that is different for DL and UL is criterion 4, i.e., "BO threshold" is used in DL and "BSR threshold" is used in UL. As a background, all the traditional applications using Transmission Control Protocol (TCP) and User Datagram Protocol (UDP) involve predominantly unidirectional data traffic. Few of the bidirectional traffic types such a "HD conversional Video calling" and "real-time gaming" are guaranteed bit rate (GBR) traffic, i.e., constant bit rate traffic, not bursty. Therefore, targeting only bidirectional application traffic for optimal MU-MIMO DL and UL scheduling is not optimal. In addition, it's been noted that targeting UL-only or DL-only application traffic from UEs separately, in parallel, in UL and DL mMIMO candidate selection is not optimal, because the UEs chosen for DL and UL will be different and will require splitting the SRS capacity. Therefore, according to an example embodiment according to the present disclosure, unidirectional application traffic happening in both DL and UL separately in a specific time window are targeted, along with the bidirectional application traffic, for selecting a common pool of candidates for DL and UL.

According to an example embodiment, instead of targeting a specific application traffic for optimal MU-MIMO scheduling, specific UEs which are optimal for MU-MIMO scheduling are targeted. More specifically, in regard to criterion 4 mentioned above, instead of checking the BO or BSR of a logical channel, which may reflect bursty application traffic only, the example embodiment targets metrics which are for a UE. For example, in DL, if BO for a UE on the eNB/gNB side is frequent and bursty, then the UE can be considered a candidate for selection. Similarly, "estimated average UE volume per second" based on purely BO of all High throughput (e.g., non-GBR) logical channels can be used for candidate consideration. The volume of UE BO can be monitored by checking the consolidated BO given by RLC layer from gNB protocol stack (e.g., volume of BO can be 5 Kbytes or 10 Kbytes). If in each window "estimated average UE volume per second" is greater than the threshold, the UE can be used for candidate consideration. In UL, if BSR for UE on the eNB/gNB side is frequent and bursty, then the UE can be considered a candidate for selection. Similarly, "estimated average UE volume per second" based on purely BSR of all High throughput (e.g., non-GBR) logical channels can be used for candidate selection. The volume of UE BSR can be monitored by checking the consolidated BSR reports from the UE (e.g., volume of BSR can be 1 Kbytes or 2 Kbytes).

If the candidate selection were being performed separately for DL and UL, then the candidate selection for DL or UL could be made based on whether in each window the "estimated average UE volume per second" is greater than the threshold. However, in order to implement a common selection criterion for both DL and UL, if the "estimated average UE volume per second" in both DL and UL for a UE is greater than the threshold, then the UE is selected as a common candidate for the common DL/UL candidate list.

The above-noted common selection criterion (i.e., the "estimated average UE volume per second" in both DL and UL for a UE is greater than the threshold) does not necessarily mean it is a bidirectional traffic; instead, the criterion merely means the UE is involved in heavy DL and UL traffic for some time, which can be monitored over a period. Selecting the candidate UE in this manner will ensure that that UE, for a window of its lifetime in the mMIMO candidate list, will provide optimal UL and DL MU-MIMO scheduling. This does not mean that DL and UL MU-MIMO scheduling for a UE will happen simultaneously; instead, the UL and DL traffic bursts will come mixed randomly within the window, which will be used to optimally schedule for MU-MIMO operation.

Table 2 shown below lists the general outline of synchronized DL and UL MU-MIMO candidate selection criteria according to an example embodiment, which are discussed in detail in the subsequent sections. Although the synchronized DL and UL MU-MIMO candidate selection criteria in Table 2 are derived from the example DL-only and UL-only MU-MIMO candidate UE selection criteria listed in Table 1, it should be noted that the synchronized DL and UL MU-MIMO candidate selection criteria according to the present disclosure can be based on any other suitable DL-only and UL-only MU-MIMO candidate UE selection criteria. The synchronized DL and UL MU-MIMO candidate selection criteria shown in Table 2 are merely examples, and the synchronized DL and UL MU-MIMO candidate selection according to the present disclosure is not limited to the criteria listed in Table 2, but can be applied to any mMIMO/MU-MIMO system with other types of criteria.

TABLE 2

| No. | General outline of Synchronized DL/UL MU-MIMO Candidate Selection Criteria |
|---|---|
| 1 | (a) Buffer Occupancy (BO) available for High throughput (for example, Non-GBR) Logical Channel<br>(b) Buffer Status Report (BSR) pending for High throughput (for example, Non-GBR) Logical Channel Group (LCG) |
| 2 | Low Mobility, UE Speed is less than 30 km/h. |
| 3 | DL SINR greater than the threshold, DL SINR >= SINR-Threshold |
| 4 | UE "estimated average UE volume per second" in Downlink AND Uplink are greater than the threshold |
| 5 | Availability of SRS Capacity |

The example synchronized DL and UL MU-MIMO candidate selection criteria shown in Table 2 are referred to as Stage-1 Criteria. However, if the candidate selection is performed with only the Stage-1 criteria, the possibility exists for a sparse candidate list resulting during non-busy traffic time in the network. In a commercial cellular network, the operation of the network during the day is split into busy hours and non-busy hours. A significant part of a user's daily traffic is concentrated in the busy hour, e.g., some of the measurements published in public forum indicate a factor of ⅓ (for 1 GB/day limit, 334 MB will used during the busy hours), and there will be 3 hours of busy hours in a day in the network. To mitigate the potential for sparse candidate list size, a state-based, multi-stage selection mechanism is beneficial, as the application traffic volume is one of the key criteria, and the multi-stage mechanism can handle different application traffic patterns dynamically. This state-based, multi-stage mechanism provides a more complete solution by mitigating the potential for sparse candidate list size. As part of a multi-stage selection mechanism, Stage-2 selection mechanism is utilized in addition to Stage-1 selection mechanism. Stage-2 selection mechanism involves selecting DL-only traffic UEs and UL-only traffic UEs as candidate UEs using, e.g., the separate DL and UL MU-MIMO candidate selection criteria listed in Table 1. It should be noted that Table 1 criteria are merely examples, and Stage-2 section can be performed using any suitable criteria.

Figure 2:
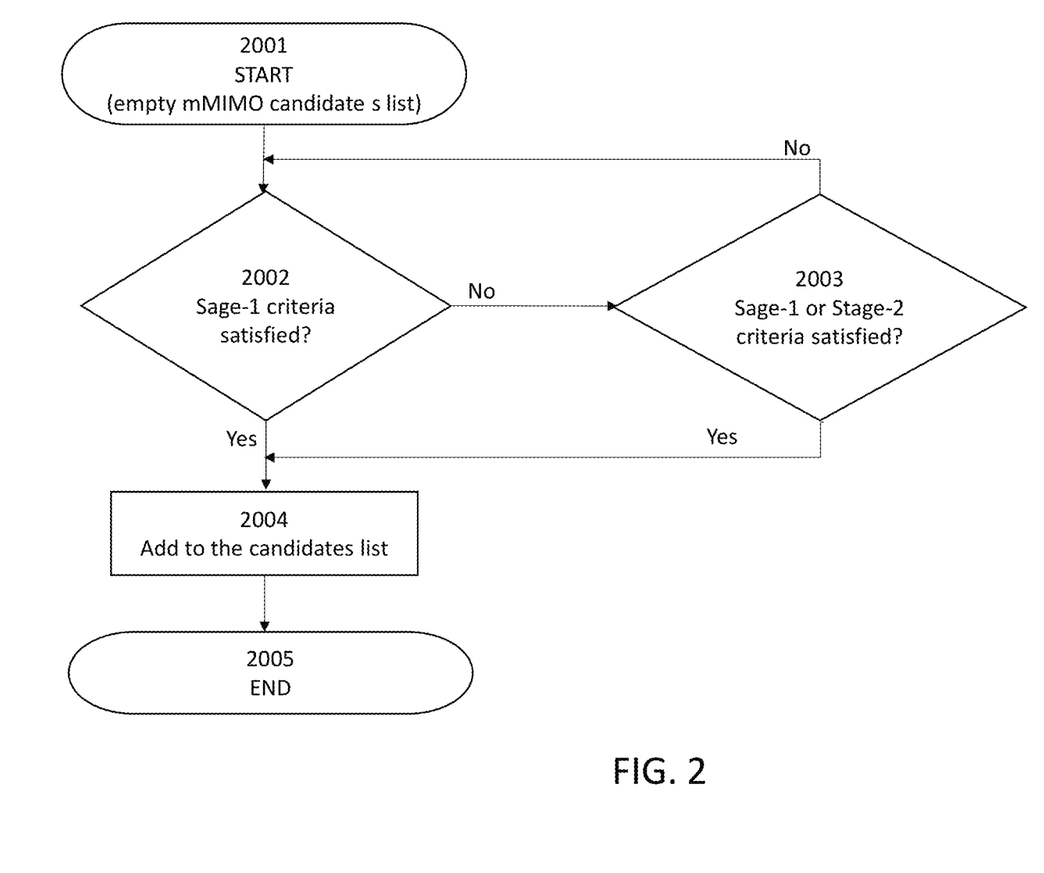
FIG. 2 is a flowchart illustrating an example embodiment of a method for adding UE candidates using a multi-stage selection mechanism.

FIG. 2 is a flowchart illustrating an example embodiment of a method for adding UE candidates using a multi-stage selection mechanism including Stage-1 criteria and Stage-2 criteria. Starting from block 2001, at which point mMIMO candidates list is empty, the process proceeds to block 2002, where it is determined whether Stage-1 criteria are satisfied for a given UE. If the answer at block 2002 is YES, the process proceeds to block 2004, where the UE is added to the candidates list. If the answer at block 2002 is NO, the process proceeds to block 2003, where it is determined whether Stage-1 or Stage-2 criteria are satisfied for a given UE. If the answer at block 2003 is YES, the process proceeds to block 2004, where the UE is added to the candidates list. If the answer at block 2003 is NO, the process loops back to block 2002. The addition process ends at block 2005.

Figure 3:
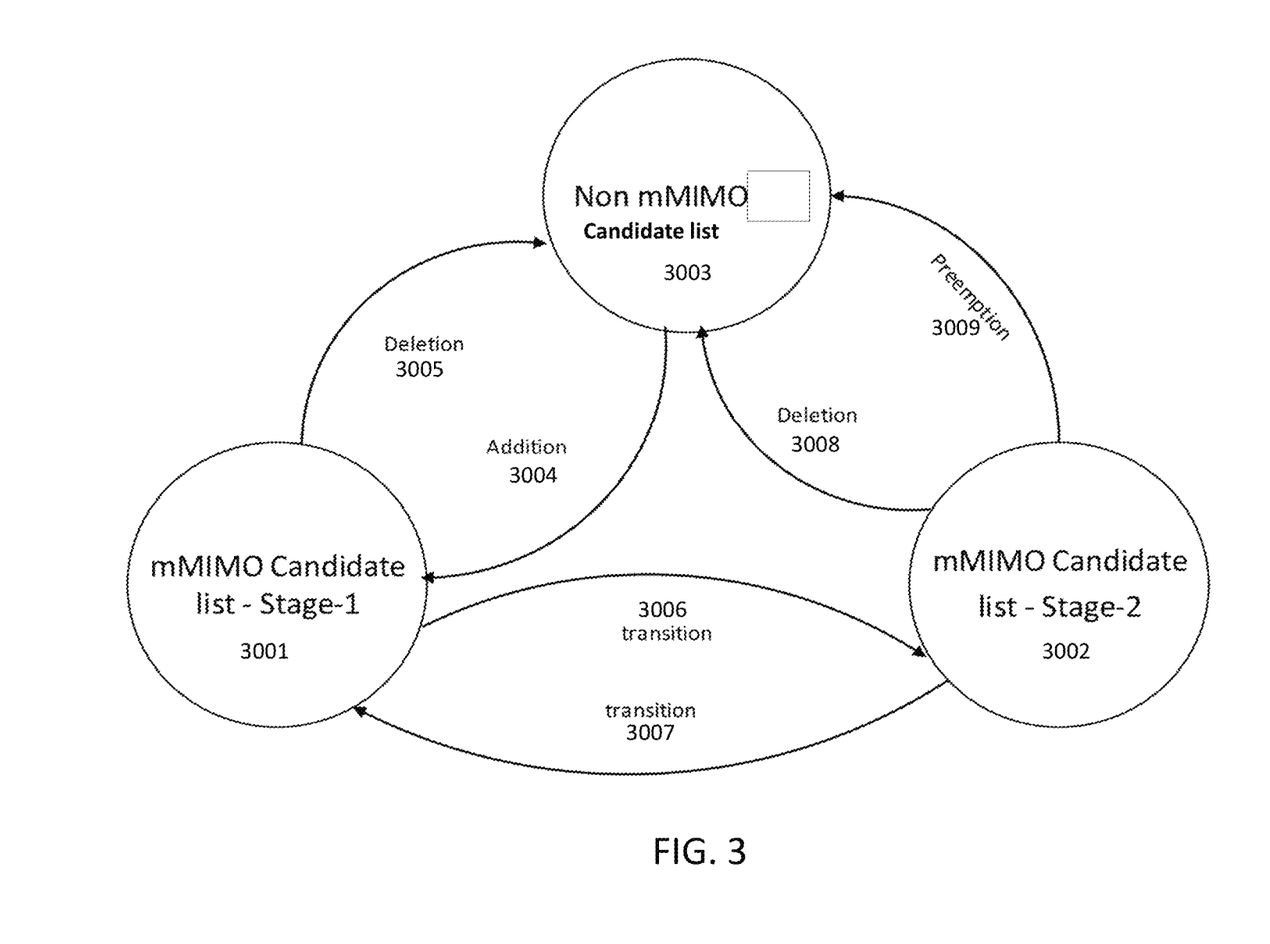
FIG. 3 is a state diagram illustrating the different states and transitions involved in an example embodiment of a method

FIG. 3 is a state diagram illustrating the different states and transitions involved in an example embodiment of a method for synchronized DL-UL MU-MIMO candidate selection. There are 3 different UE states shown in FIG. 3:
i) "mMIMO Candidate list—Stage-1" state 3001, which includes only "Stage-1 Candidates"; ii) "mMIMO Candidate list—Stage-2" state 3002, which includes both "Stage-1 Candidates" and "Stage-2 Candidates"; and iii) "Non mMIMO Candidate list" state 3003, which includes regular UEs which are not considered for MU-M IMO transmissions. In addition, 6 different UE state transitions are shown in FIG. 3:
1) Stage-1 Addition 3004: Transition to move from "Non mMIMO Candidate list" state to "mMIMO Candidate list—Stage-1" state.
2) Stage-1 Deletion 3005: Transition to move from "mMIMO Candidate list—Stage-1" state to "Non mMIMO Candidate list" state.
3) Stage-1 to Stage-2 Transition 3006: Transition to move from "mMIMO Candidate list—Stage-1" state to "mMIMO Candidate list—Stage-2" state.
4) Stage-2 to Stage-1 Transition 3007: Transition to move from "mMIMO Candidate list—Stage-2" state to "mMIMO Candidate list—Stage-1" state.
5) Stage-2 Deletion 3008: Transition to move from "mMIMO Candidate list—Stage-2" state to "Non mMIMO Candidate list" state.
6) Stage-2 Preemption 3009: Transition to move from "mMIMO Candidate list—Stage-2" state to "Non mMIMO Candidate list" state.

The example embodiment of the synchronized DL-UL MU-MIMO candidate selection method according to the present disclosure can be described with references to two stages (Stage-1 and Stage-2) and multiple state transitions described below and shown in FIG. 3.
i) Stage-1 Addition 3004: Select the UEs a) with both DL and UL traffic, and b) satisfying the common selection criteria described in the previous sections. The UEs selected in this stage are called "Stage-1 Candidates".
ii) Stage-1 to Stage-2 transition 3006: If the use of the common selection criteria does not result in finding the candidate UEs in Stage-1 and there are candidate slots available in the candidate list, then the process proceeds to Stage-2.
iii) Stage-2 3002: In Stage-2, DL-only traffic UEs and UL-only traffic UEs satisfying the selection criteria described in the previous sections (e.g., Table 1) are selected as candidates. The UEs selected in this stage are called "Stage-2 Candidates". While Stage-2 is active, Stage-1 common selection criteria will also be actively checked in parallel for candidate selection.
iv) Stage-2 Candidates Preemption 3009: Whenever a) application of the Stage-1 common selection criteria results in finding candidate UEs while Stage-2 is active in parallel, and b) there is no free slot in the candidates list, Stage-2 Candidates are preempted from the candidates list (i.e., deleted from mMIMO Candidate list Stage-2 and moved to non-mMIMO Candidate list), as described in detail below.
v) Stage-2 to Stage-1 transition 3006: While Stage-2 is active, if all the Stage-2 Candidates are preempted from the candidates list (i.e., deleted from mMIMO Candidate list Stage-2 and moved to non-mMIMO Candidate list) and there are no slots available in the candidates list, then the process transitions to Stage-1.
vi) Stage-1 Candidates Deletion 3005: Criteria to delete Stage-1 candidates from the candidates list are satisfied, as described in detail below.
vii) Stage-2 Candidates Deletion 3008: Criteria to delete Stage-2 candidates from the candidates list are satisfied, as described in detail below.

In this section, Stage-2 candidates selection process (occurring in state 3002 in FIG. 3) will be described in detail. As mentioned above, if the use of the common selection criteria does not result in finding the candidate UEs in Stage-1 and there are candidate slots available in the candidate list, then the process proceeds to Stage-2. In Stage-2, DL-only traffic UEs and UL-only traffic UEs satisfying the selection criteria described in the previous sections are selected as candidates. In Stage-2, the proportion of DL-only traffic UEs (M) and UL-only traffic UEs (N) can be flexible, e.g., M+N=n to M+N=n/2 in the candidate list, n being 64 UEs, as an example. To illustrate an example case, in Stage-1, UEs with both DL and UL traffic (referred to as "M1N1") are Stage-1 candidate UEs, and in Stage-2 DL-only traffic UEs (M) and Stage-2 UL-only traffic UEs (N) are Stage-2 candidate UEs. In this example scenario, the "M1N1"+M should be at least n/2 (e.g., 32 UEs), so that the user pairing will have sufficient candidates to find X orthogonal UEs for pairing (e.g., in the case both UL-only traffic and DL-only traffic UEs are available as candidates), X being the MU-MIMO allocation maximum user pairing capacity. As an example, for a Physical Downlink Shared Channel (PDSCH) with MU-MIMO allocation the maximum user pairing capacity can be 8, i.e., 8 UEs can be paired for that PDSCH MU-MIMO allocation in a given transmission time interval (TTI).

As an alternative example embodiment, in the case the DL-only traffic UEs significantly outnumber the UL-only traffic UEs (e.g., if UL UEs do not satisfy both the Stage-1 or Stage-2 criteria), then "M1N1"+M>"n"/2 (e.g., 64/2 UEs) can be implemented. Similarly, in the case the UL-only traffic UEs significantly outnumber the DL-only traffic UEs (e.g., if DL UEs do not satisfy both the Stage-1 or Stage-2 criteria), then "M1N1"+N>"n"/2 (e.g., 64/2 UEs) can be implemented. If both DL-only traffic and UL-only traffic UEs are available, there is no specific priority to the UEs, and it is desired to achieve a balanced mMIMO scheduling in both DL and UL, so in this case "M1N1"+M="M1N1"+N="n"/2 (for example, 64/2), at least.

In this section, Stage-2 candidates preemption 3009 process will be described in detail. Whenever a) application of the Stage-1 common selection criteria results in finding candidate UEs while Stage-2 is active in parallel, and b)

there is no free slot in the candidates list, Stage-2 Candidates are preempted (deleted) from the candidates list, e.g., in a first-in-first-out (FIFO) manner (i.e., Stage-2 candidate which was added first will be preempted first). The Stage-2 candidates preemption process according to the present disclosure prioritizes preempting all the UL-only traffic UEs from the candidates list first before preempting the DL-only traffic UEs. The reason for preempting the DL-only traffic UEs last is because i) the DL time/frequency resources capacity and DL traffic flow is significantly larger compared to UL in the TDD systems, and ii) retaining the DL-only traffic UEs until later ensures there are high number of DL UE candidates for DL user pairing.

If the UEs already added to the mMIMO/MU-MIMO UE candidates list is no longer satisfying any of the criteria used for the "Stage-1" or "Stage-2" UE candidates selection, these UEs are deleted from the candidates list in order to prevent degradation of the MU-MIMO performance. For example, UEs with low SINR and/or low buffer will degrade the MU-MIMO performance. In an example of the method according to the present disclosure, the deletion of the UE no longer satisfying the selection criteria need not be delayed for a few TTIs to see whether the UE recovers and satisfies the selection criteria again, which is unlikely. For example, if the UE's SINR is less than the specified threshold, it is unlikely the SINR will improve within a few TTIs. As another example, if the data traffic associated with the UE is less than the specified threshold, the data traffic is unlikely to flow again within a few TTIs, because most of the data traffic is bursty.

In this section, an example embodiment of a synchronized selection process for the selection of mMIMO/MU-MIMO candidate UEs in the DL and UL (Stage-1 candidate UEs) is described in detail. The synchronized selection criteria include the following:

1) Only UEs with High throughput (e.g., non-GBR) BSR (for UL) and BO (for DL) pending for a logical channel, waiting to be scheduled in the current TTI, are considered for selection.

2) MuMimoDlSinr>MuMimoSinrThres
MuMimoDlSinr (representing MU-MIMO DL MCS SINR) is for a single layer SINR for a single codeword. In the case there are two codewords and corresponding CQI-to-SINR mapping, the two codewords are converted to a single codeword. MuMimoDlSinr is the DL SINR before adding the DL OLRC offset. MuMimoSinrThres (representing MU-MIMO DL MCS SINR threshold) is configurable, e.g., depending on the MU-MIMO operation.

3) The UE's speed should be lesser than 30 km/h.

4) The UE should have SRS resource and the channel vectors for the entire applicable bandwidth ready, in order to find the correlation with other UEs.

5) The following buffer-related criteria for MU-MIMO candidate selection are satisfied:

i) The estimated average UE Volume per second for DL ("UeDlEstAvgVolumerPerSec") based purely on BO of all High throughput (e.g., Non-GBR) logical channels is considered. If in each window UeDlEstAvgVolumerPerSec is greater than the corresponding MU-MIMO UE DL Stage-1 threshold (designated MuMimoUeDlStage1Thres), i.e., UeDlEstAvgVolumerPerSec>MuMimoUeDlStage1Thres, the UE meets this selection criterion. MuMimoUeUlStage1Thres is configurable, e.g., depending on the MU-MIMO operation.

ii) The estimated average UE Volume per second for UL ("UeUlEstAvgVolumerPerSec") based purely on BSR of all High throughput (e.g., Non-GBR) logical channels is considered. If in each window UeUlEstAvgVolumerPerSec is greater than the corresponding MU-MIMO UE UL Stage-1 threshold (designated MuMimoUeUlStage1Thres), i.e., UeUlEstAvgVolumerPerSec>MuMimoUeUlStage1Thres, the UE meets this selection criterion. MuMimoUeUlStage1Thres is configurable, e.g., depending on the MU-MIMO operation.

iii) In summary, a UE is selected as a Stage-1 common candidate for DL/UL candidate list if the following two conditions are both satisfied:

(UeDlEstAvgVolumerPerSec>MuMimoUeDlStage1Thres), and (UeUlEstAvgVolumerPerSec>MuMimoUeUlStage1Thres)

Glossary of Terms

BO—Buffer Occupancy
BSR—Buffer Status Report
SRS—Sounding Reference Signal
mMIMO—Massive Multiple Input Multiple Output
MU-MIMO—Multi-User Multiple Input Multiple Output
eNB—Evolved Node B
gNB—Next Generation Node B
CSI—Channel State Information
DL—Downlink
UE—User Equipment
UL—Uplink
CU—Centralized Unit
DU—Distributed Unit
Non-GBR—Non-Guaranteed Bit Rate
GBR—Guaranteed Bit Rate
LCG—Logical Channel Group
SIB—System Information Blocks
SR—Scheduling Request
PUCCH—Physical Uplink Control Channel
MAC—Media Access Control
MCS—Modulation and Coding Scheme
TPC—Transmit Power Control
TTI—Transmit Time Interval
IP—Internet Protocol
SFN—System Frame Number
PUSCH—Physical Uplink Shared Channel
DCI—Downlink Control Information
SF—Subframe Number
LTE—Long Term Evolution
NR—New Radio
LCD—Logical Channel Identifier
RV—Redundancy Version
CRC—Cyclic Redundancy Check
BWP—Bandwidth Part
CBG—Code Block Groups
TB—Transport Block
OLRC—Outer Loop Rate Control
PRB—Physical Resource Block
QoE—Quality of Experience
RTT—Round Trip Time
PDU—Protocol Data Unit
RI—Rank Indicator
BLER—Block Error Rate
SINR—Signal to Interference and Noise Ratio
PDSCH—Physical Downlink Shared Channel
MIMO—Multiple Input Multiple Output
CQI—Channel Quality Indicator
QAM—Quadrature Amplitude Modulation
QPSK—Quadrature Phase Shift Keying
iMcs=ith Modulation and Coding Scheme iTbs=ith Transport Block Size
IIR—Infinite Impulse Response
CW—Codeword
TD—Transmit Diversity
CRNTI—Cell Radio Network Temporary Identifier
ID—Identifier
RRC—Radio Resource Control
PMI—Precoding Matrix Indicator
3GPP—3rd Generation Partnership Project
UDP—User Datagram Protocol

What is claimed is:

1. A method for synchronized selection of user equipments (UEs) for both downlink (DL) Multi-User Multiple Input Multiple Output (MU-MIMO) operation and uplink (UL) MU-MIMO operation, comprising:
applying, by one of an Evolved Node B (eNB) or a Next Generation Node B (gNB), a common set of selection criteria for selecting a common pool of UE candidates to implement MU-MIMO-allocation user pairing for both DL MU-MIMO operation and UL MU-MIMO operation, wherein the common set of selection criteria are applied in Stage-1 selection process to select Stage-1 candidates for a UE candidates list; and
if the Stage-1 selection process applying the common set of selection criteria is not able to find UE candidates to fill available slots in the UE candidates list, initiating, by one of the eNB or the gNB, Stage-2 selection process involving 1) applying a first set of Stage-2 selection criteria to select DL-only traffic UEs as Stage-2 candidates for the UE candidates list, and 2) applying a second set of Stage-2 selection criteria to select UL-only traffic UEs as Stage-2 candidates for the UE candidates list;
wherein:
the number of the Stage-1 candidates is represented by M1N1;
the number of Stage-2 DL-only traffic candidate UE is represented by M;
the number of Stage-2 UL-only traffic candidate UE is represented by N;
Sounding Reference Signal (SRS) capacity is represented by n; and
at least one of i) M1N1+M=n, ii) M1N1+N=n, iii) M1N1+M=n/2, and iv) M1N1+N=n/2.

2. The method according to claim 1, wherein a Time Division Duplex (TDD)-based MU-MIMO system is utilized.

3. The method according to claim 1, comprising:
avoiding splitting the SRS capacity of a wireless cell between DL MU-MIMO algorithm and UL MU-MIMO algorithm.

4. The method according to claim 1, wherein after Stage-2 selection process is initiated, the Stage-1 selection process and the Stage-2 selection process are active simultaneously.

5. The method according to claim 4, further comprising:
if i) the Stage-1 selection process applying the common set of selection criteria is able to find UE candidates while the Stage-2 selection process is active, and ii) there is no available slot in the UE candidates list, then deleting, by one of the eNB or the gNB, Stage-2 candidate from the UE candidates list.

6. The method according to claim 5, wherein UL-only traffic UEs are deleted from the UE candidates list before DL-only traffic UEs are deleted.

7. The method according to claim 6, wherein the deletion of the UL-only traffic UEs and the deletion of the DL-only traffic UEs are implemented in first-in-first-out (FIFO) manner.

8. The method according to claim 1, wherein the common set of selection criteria applied in Stage-1 selection process comprises a criterion based on DL Signal to Noise Ratio (SINR) threshold.

9. The method according to claim 1, wherein the common set of selection criteria applied in Stage-1 selection process comprises a criterion based on a combination of i) a first threshold based on DL Buffer Occupancy (BO), and ii) a second threshold based on UL Buffer Status Report (BSR).

10. The method according to claim 1, wherein i) the first threshold is for estimated average UE volume per second derived based on Buffer Occupancy (BO) of all High throughput logical channels for DL, and ii) the second threshold is for estimated average UE volume per second derived based on Buffer Status Report (BSR) of all High throughput logical channels for UL.

11. The method according to claim 1, further comprising at least one of:
i) deleting, by one of the eNB or the gNB, a Stage-1 candidate from the UE candidates list if the Stage-1 candidate no longer satisfies any of the common set of selection criteria applied in Stage-1 selection process; and
ii) deleting, by one of the eNB or the gNB, a Stage-2 candidate from the UE candidates list if the Stage-2 candidate no longer satisfies any criterion in the corresponding one of the first or second set of Stage-2 selection criteria used to select the Stage-2 candidate.

12. The method according to claim 11, further comprising:
if all the Stage-2 candidates are deleted from the UE candidates list and no available slot exists in the UE candidates list, ending the Stage-2 selection process and transitioning to only Stage-1 selection process.

13. The method according to claim 5, further comprising:
if all the Stage-2 candidates are deleted from the UE candidates list and no available slot exists in the UE candidates list, ending the Stage-2 selection process and transitioning to only Stage-1 selection process.

14. The method according to claim 8, wherein the criterion based on DL Signal to Noise Ratio (SINR) threshold is mapped from DL Channel Quality Indicator (CQI).

15. The method according to claim 14, wherein:
the criterion based on DL SINR threshold is DL Modulation and Coding Scheme (MCS) SINR;
DL CQI is mapped to SINR to produce "CQI-SINR";
MCS is mapped to SINR to produce "MCS-SINR"; and
CQI-SINR is mapped to MCS-SINR to produce DL MCS SINR.

16. The method according to claim 3, wherein the common set of selection criteria applied in Stage-1 selection process comprises a criterion based on DL Signal to Noise Ratio (SINR) threshold.

17. The method according to claim 3, wherein the common set of selection criteria applied in Stage-1 selection process comprises a criterion based on a combination of i) a first threshold based on DL Buffer Occupancy (BO), and ii) a second threshold based on UL Buffer Status Report (BSR).

18. The method according to claim 17, wherein i) the first threshold is for estimated average UE volume per second derived based on Buffer Occupancy (BO) of all High throughput logical channels for DL, and ii) the second threshold is for estimated average UE volume per second derived based on Buffer Status Report (BSR) of all High throughput logical channels for UL.

19. The method according to claim 3, further comprising at least one of:
   i) deleting, by one of the eNB or the gNB, a Stage-1 candidate from the UE candidates list if the Stage-1 candidate no longer satisfies any of the common set of selection criteria applied in Stage-1 selection process; and
   ii) deleting, by one of the eNB or the gNB, a Stage-2 candidate from the UE candidates list if the Stage-2 candidate no longer satisfies any criterion in the corresponding one of the first or second set of Stage-2 selection criteria used to select the Stage-2 candidate.

* * * * *